United States Patent [19]

Ammon et al.

[11] Patent Number: 5,114,523
[45] Date of Patent: May 19, 1992

[54] PROCESS AND DEVICE FOR MANUFACTURE OF ADHESIVE ROLLS FOR ROLLER REVERSING MECHANISMS OF WEB-PROCESSING MACHINES, PARTICULARLY WEB-FED PRINTING PRESSES

[75] Inventors: Ernst Ammon, Seidenweg; Robert Langsch, Zollikofen, both of Switzerland

[73] Assignee: WIFAG, Bern, Switzerland

[21] Appl. No.: 544,208

[22] Filed: Jun. 26, 1990

[30] Foreign Application Priority Data

Jun. 27, 1989 [DE] Fed. Rep. of Germany ....... 3921045

[51] Int. Cl.⁵ .................... B23P 11/02; B23P 19/04
[52] U.S. Cl. .................... 156/294; 29/450; 29/235; 156/287
[58] Field of Search ............ 156/294, 287, 423; 29/450, 234, 235, 451, 446, 426.6

[56] References Cited

U.S. PATENT DOCUMENTS

| | | | |
|---|---|---|---|
| 2,645,004 | 7/1953 | Dorner | 29/450 |
| 3,146,709 | 9/1964 | Bass et al. | 29/450 |
| 3,647,589 | 3/1972 | Felden | 156/294 |
| 3,740,288 | 6/1973 | Bhagat | 156/294 |
| 3,846,901 | 11/1974 | Lovett | 29/450 |
| 3,900,941 | 8/1975 | Browning et al. | 29/450 |

FOREIGN PATENT DOCUMENTS

| | | |
|---|---|---|
| 1189688 | 4/1959 | Fed. Rep. of Germany . |
| 2515682 | 4/1975 | Fed. Rep. of Germany . |
| 3505214 A1 | 2/1985 | Fed. Rep. of Germany . |

*Primary Examiner*—Michael W. Ball
*Assistant Examiner*—Daniel J. Stemmer
*Attorney, Agent, or Firm*—McGlew & Tuttle

[57] ABSTRACT

A method and device for adhesive rolls for a roll-reversing mechanism of web-processing machines, particularly w-fed [rotary] printing presses. A flexible tube-shaped piece (14) consisting of a soft elastic material is shifted onto a support tube (1), which is axially joined with a transition piece (2) and a tube support (3). In the region of transition piece (2), compressed air, which has been introduced, flows out, to creates an air cushion (15) between the flexible tube-shaped piece (14) and the tube support (3) onto which the flexible tube-shaped piece (14) is shifted.

9 Claims, 5 Drawing Sheets

PROCESS AND DEVICE FOR MANUFACTURE OF ADHESIVE ROLLS FOR ROLLER REVERSING MECHANISMS OF WEB-PROCESSING MACHINES, PARTICULARLY WEB-FED PRINTING PRESSES

FIELD OF THE INVENTION

The invention relates generally to a process for the manufacture of adhesive rolls for roller-reversing mechanisms of a web- processing machine, particularly a web-fed printing press.

The invention relates generally to a process and apparatus for applying a flexible layer to rollers used in graphic machines such as printing presses or coating machines and more particularly to applying a flexible layer to rollers which includes a dimensionally stable carrying tube that is closed at both ends with covers for receiving bearing journals and a device for conducting the process.

Such adhesive rolls serve in roller-reversing mechanisms, particularly for web-fed printing presses for the purpose of pressing the outrunning end of the processed paper web onto the adhesive-prepared position at the beginning of the new web directly before a knife separates the old web which was run through. This transition from the outrunning end of the old web to the beginning of the new web is conducted at full production speed.

Special requirements are placed on adhesive rolls. Thus, the surface of the adhesive roll must be foam soft in order to introduce a planar compression zone in the adhesive process when the two webs are joined together, and not only a linear shaped zone. Also, the adhesive rolls must be able to take up out-of-round and run-out situations of the web rollers without vibrating themselves. Further, the adhesive roll must be able to equilibrate the conical shape of the web rollers.

BACKGROUND OF THE INVENTION

In the past, such adhesive rolls have been manufactured by drawing a flexible tube-shaped foam piece onto a form- stable tube support piece. The inside diameter of the flexible tube-shaped foam is very different from the tube support piece due to its large tolerances. In order to be able to start with a standardized tube support size, in which a cover would still be introduced for taking up the pivot pins, it was necessary to select the outer diameter of the tube support such that it corresponds to the smallest possible inside diameter of the flexible tube-shaped foam. The adaptation of the outer diameter of the tube support to the inside diameter of the flexible tube-shaped foam was achieved by vulcanizing a rubber layer onto the tube support and subsequent smoothing. The rubber layer was then provided with a layer of contact adhesive, and the flexible tube-shaped foam was drawn onto the tube support.

To allow it to dry, the formed adhesive roll had to be wrapped up tightly over the entire surface, and in this way a full circumferential adhering could be produced.

SUMMARY AND OBJECT OF THE INVENTION

It is an object of the invention to create a process for the manufacture of adhesive rolls with which adhesive rolls can be manufactured in a simple, time-saving, and inexpensive manner, and whereby, in particular, the additional vulcanization of a rubber layer on the tube support can be eliminated.

According to the invention, a flexible material foam element is provided comprising a foam element tubular body formed having a length corresponding to the width of the roller. The foam element tubular flexible body is first pushed over a support tube having a support tube diameter. The support tube carrying the foam element flexible body is axially connected to a carrying tube via a transmission piece. Compressed air is supplied to a discharge zone of the transition piece and the foam element tubular flexible body is pushed from the support tube, via the transition piece, completely over the carrying tube on a cushion of air which is built up by the compressed air issuing at the discharge zone.

The apparatus includes the arrangement cf the support tube and transition piece which are connected to the carrying tube. The transition piece has a conical surface with a smaller diameter corresponding to the diameter of the support tube and a larger diameter which is slightly larger than the diameter of the carrying tube. The transition piece includes axial threaded pins on both sides which pins are received in threaded holes formed in the support tube and carrying tube. On an end face of the conical surface of the transition piece, at the larger diameter end, an annular channel is provided which communicates via holes with a bore arranged axially in the threaded pin. A compressed air connection piece may be screwed into an end cover of the carrying tube such that air enters the transition piece via the carrying tube and then via the bore arranged axially in the threaded pin.

According to a further aspect of the process of the invention, the carrying tube is coated with an adhesive prior to the tubular flexible body being pushed over it.

It is possible with this process to draw the flexible tube-shaped foam element onto the tube support in such a way that it is prestressed. Consequently, an adhesive process can be eliminated.

Nevertheless, if the flexible tube-shaped foam element is joined to the tube support by an adhesive process, it is not necessary to wrap up the adhesive roll during the hardening, since the flexible tube-shaped foam element has been prestressed.

According to a further aspect of the process of the invention, the carrying tube is coated with an adhesive prior to the tubular flexible body being pushed over it.

Handling is very simple, if the tube support is sealed to make up one piece with a cover, which is provided in its center with an axial threaded hole. The transition piece can be screwed into this threaded hole. The tube support is also sealed on both sides with covers, which have, for their part, centrally arranged, axial threaded holes. Thus the tube support can also be screwed onto the transition piece.

A compressed air connection can be screwed onto the cover lying opposite the transition piece. The introduction of compressed air can then be made through the tube support into the transition piece. The compressed air flows out through openings, which are arranged in the transition piece, particularly in the region of the joints with the tube support, and forms an air cushion under the flexible tube-shaped foam to be drawn on.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
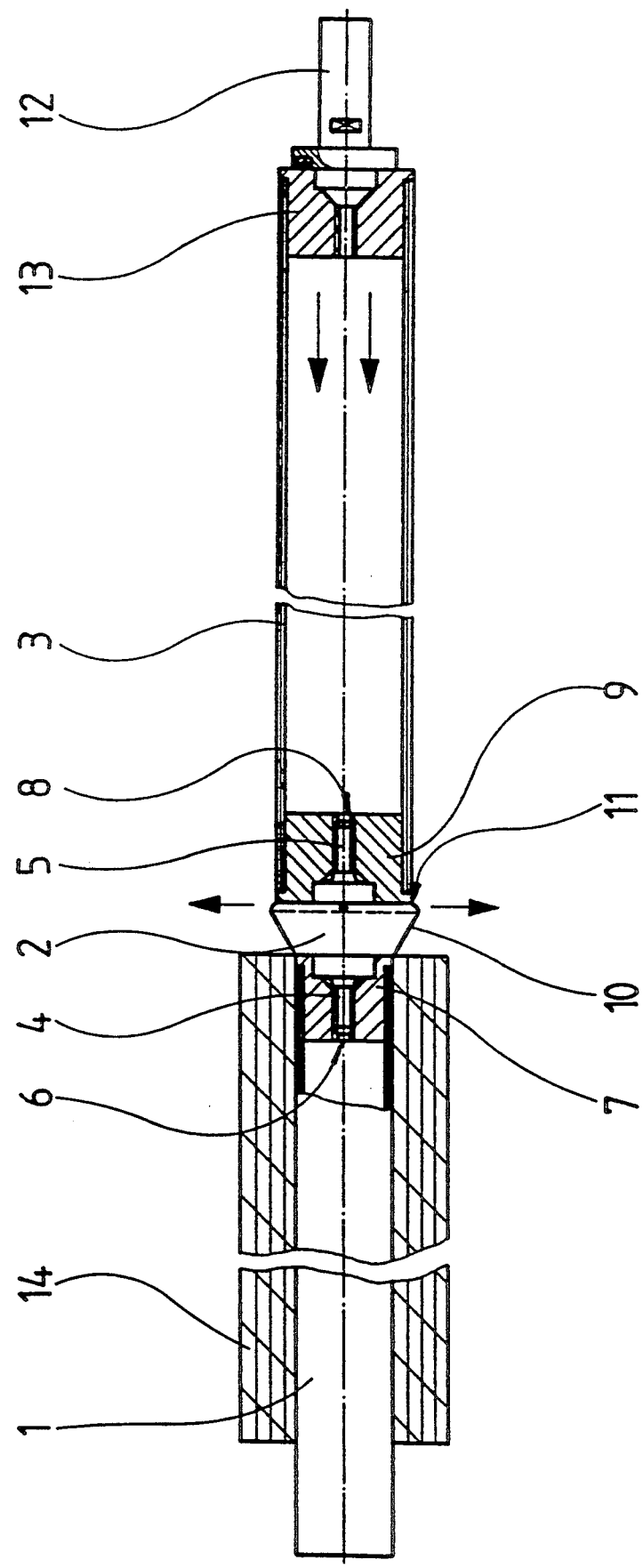
FIG. 1 is a sectional view of the arrangement for drawing on a flexible tube-shaped foam element, which is disposed on a support tube.

As can be seen from FIG. 1, a support tube 1, a transition piece 2, and a tube support 3 are axially screwed together. Transition piece 2 is provided equipped on both sides with a threaded pin 4, 5.

Threaded pin 4 thus passes into threaded hole 6, which is introduced in a cover 7. The cover 7 seals support tube 1. Threaded pin 5 is screwed into threaded hole 8, which is introduced in cover 9. Cover 9 seals tube support 3.

Transition piece 2 has a conical surface 10, which bridges the diameter increase from support tube 1 to tube support 3. In the region of joint 11 between transition piece 2 and tube support 3, compressed air flows out at a discharge outlet area or discharge zone.

The compressed air is introduced by a compressed-air connection piece 12, which is screwed into cover 13. The connection piece 12 seals tube support 3 on the outer side, and then passes through tube support 3.

According to the process of the invention the flexible tube-shaped foam unit 14 is shifted onto support tube 1. The outer diameter of support tube 1 is smaller than the minimal tolerable inner diameter of the flexible tube-shaped foam unit 14.

Figure 2:
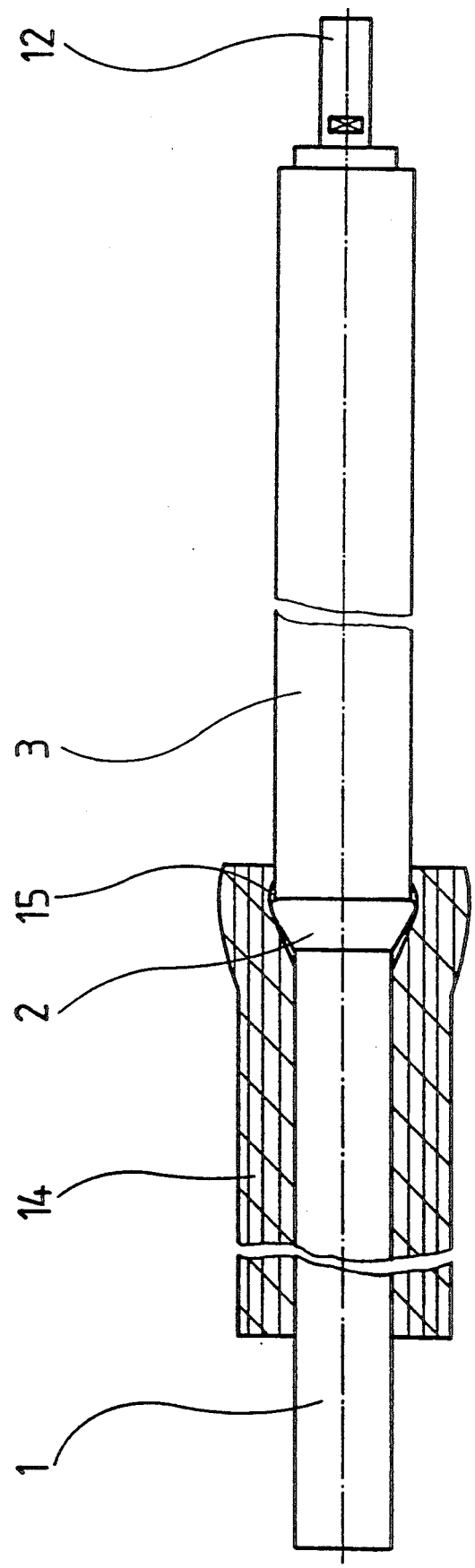
FIG. 2 is a partial sectional view of the arrangement in which the flexible tube-shaped foam element is being drawn on a tube support.
Figure 3:
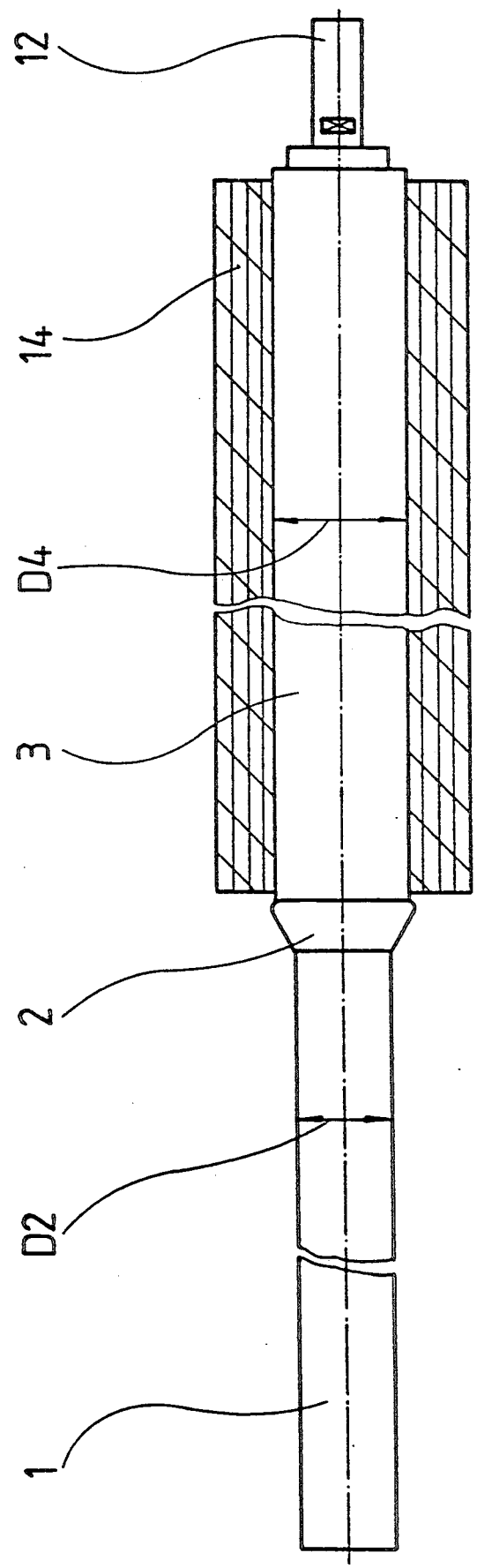
FIG. 3 is a partial sectional view of a arrangement with the drawn- on flexible tube-shaped foam unit in place.

The flexible tube-shaped foam unit 14 is shifted over conical surface 10 of transition piece 2 in the direction of tube support 3, as is shown in FIG. 2. As soon as the beginning of the flexible tube-shaped foam piece 14 is shifted over joint 11, an air cushion 15 is formed by the outflowing compressed, air between the flexible tube-shaped foam piece 14 and tube support 3. This air cushion 15 makes possible a complete drawing of the flexible tube-shaped foam piece 14 onto tube support 3 in a trouble free manner, as shown in FIG. 3. The outer diameter of tube support 3 is thus larger than the maximum tolerable inner diameter of flexible tube-shaped foam piece 14, so that flexible tube-shaped foam piece 14 drawn onto tube support 3 is always under a certain prestress.

Preferably, tube support 3 is coated with an adhesive prior to the drawing on of the flexible tube-shaped foam piece 14. Even with the tube support 3 coated with adhesive, the drawing on of flexible tube-shaped foam piece 14 offers no problems, due to the generated air cushion 15. And since the flexible tube-shaped the foam piece 14 is drawn together by its prestressing after the compressed air source is disconnected, no additional action on the foam piece 14 is necessary for hardening the adhesive. The adhesion step is optimal.

Figure 5:
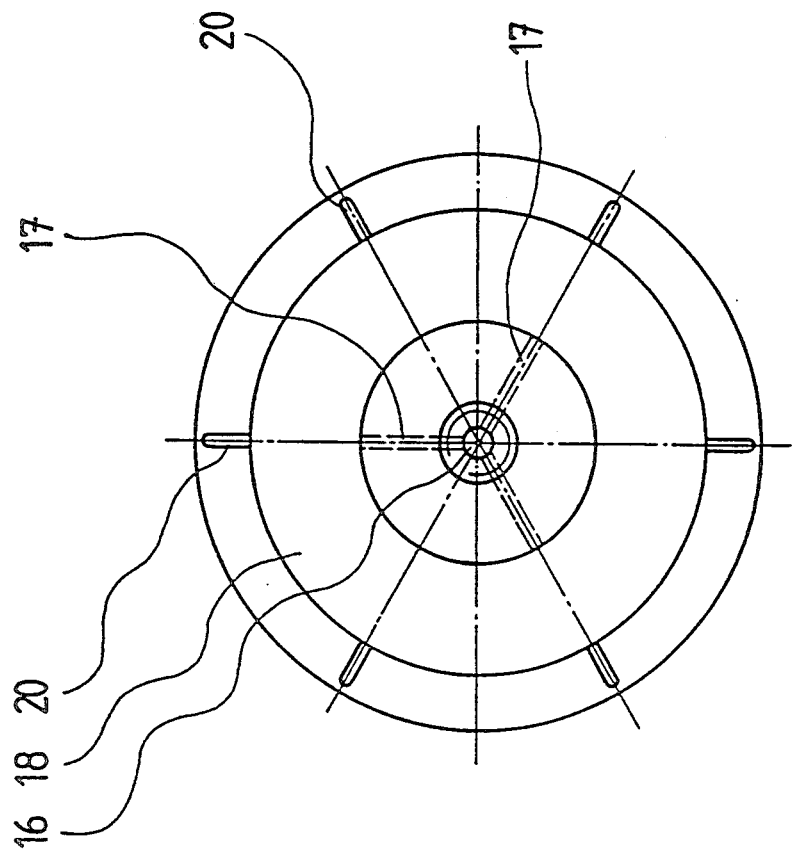
FIG. 5 is a top view of the transition piece of FIG. 4.
Figure 4:
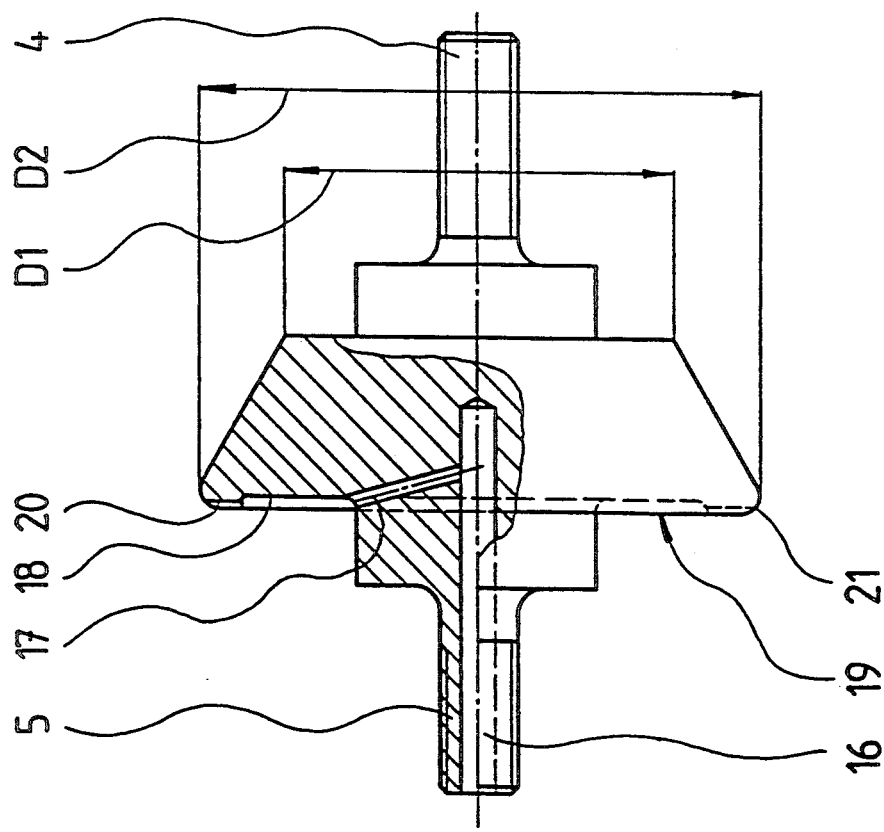
FIG. 4 is a partial cut away view of a transition piece.

FIGS. 4 and 5 show transition piece 2. The threaded pins 4 and 5 are arranged on both sides of conical surface 10. Threaded pin 5, which is screwed into cover 9 of tube support 3 has an axial borehole 16 in its center. Holes 17 which are introduced approximately radially, open up into this borehole 16; the holes join borehole 16 with an annular channel 18. This annular channel 18 is introduced in the front side 19 of conical surface 10 with the large diameter around the center. Radially arranged grooves 20 serve for passage of compressed air, which is introduced through tube support 3 to flow out in the region of joint 11 between transition piece 2 and tube support 3.

The conical surface 10 has on its thickest part, which is joined with tube support 3, a larger diameter than tube support 3 itself. The latter region present over tube support 3 and provided with a curvature 21 serves as a quasi-gasket for the compressed air; thus it cannot flow away in the direction of support tube 1 underneath the flexible tube-shaped foam piece 14 that is to be drawn on.

Figure 6:
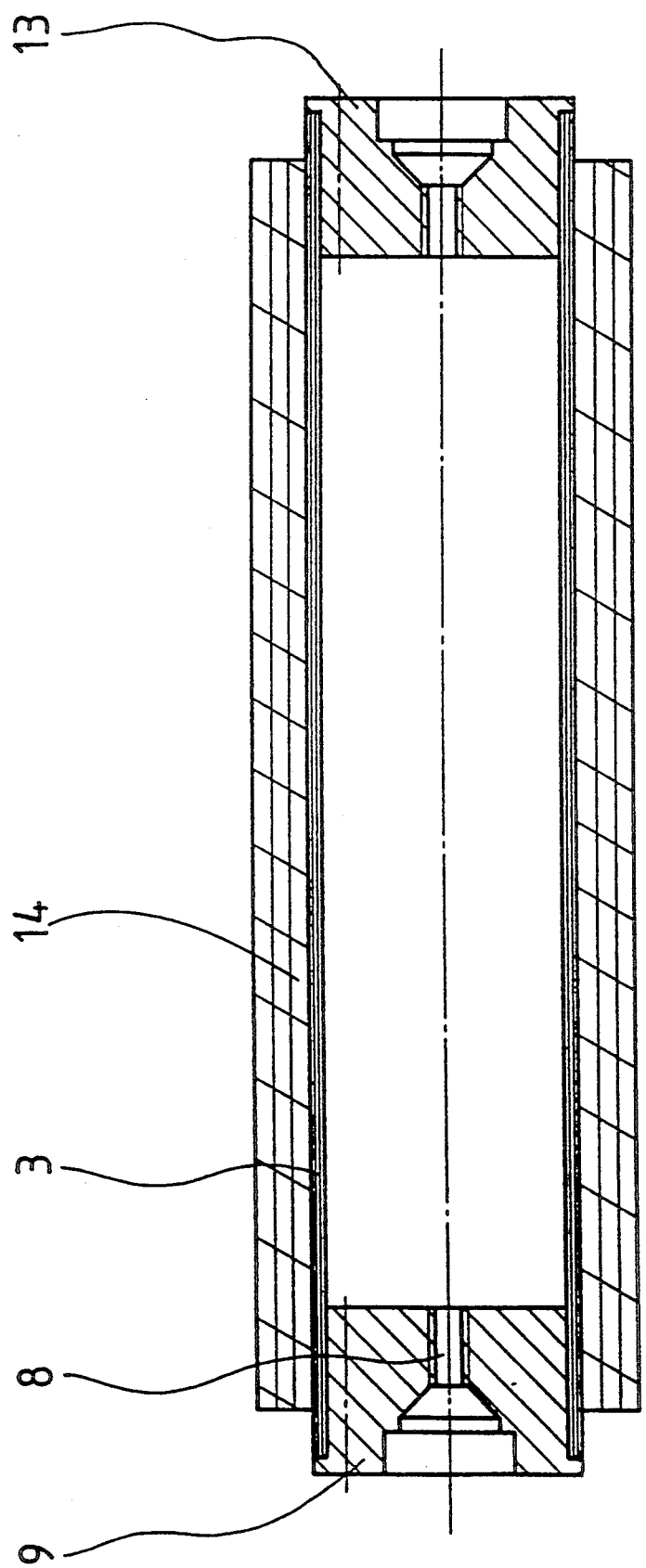
FIG. 6 is a cross sectional view of the finished adhesive roll.

FIG. 6 shows the finished adhesive roll. Conventional precision tubes found on the market are used as tube support 3, and these require no further processing steps, except for cutting to length. Covers 9 and 13 are pressed on. The flexible tube-shaped foam piece 14 is finished to the desired size.

Tube support 3 may consist of practically any material which has the necessary strength. By doing away with the vulcanizing process of a rubber layer, steel tubes do not need to be used.

As tests have shown, a longer service life is obtained with adhesive rolls prepared in such a way, and this can be attributed to the flexible tube-shaped foam piece 14 which is prestressed.

While a specific embodiment of the invention has been shown and described in detail to illustrate the application of the principles of the invention, it will be understood that the invention may be embodied otherwise without departing from such principles.

What is claimed is:

1. A process for manufacturing adhesive rolls for web processing machine rolls for web fed printing presses, comprising the steps of:

providing an adhesive roller including a dimensionally stable carrying tube having a first mounting end and a second mounting end for providing a compressed gas conduit; providing a compressed gas connection at said first mounting end and passing gas through said second mounting end; providing a soft elastic tubular body of flexible foam material, the support tube having an external diameter smaller than an internal diameter of the soft elastic tubular body; having a transition piece providing a first connection end, a second connection end, and a transition piece conduit extending from said first connection end to a discharge zone; said transition piece also having a conical surface and a discharge side, said conical surface having a small diameter end, the small diameter end being substantially equal in dimension to said external diameter of said carrying tube and including a large diameter end, said large diameter end being larger in dimension than an external diameter of said carrying tube, said discharge side having a substantially angled surface extending from said large diameter end to a reduced diameter end, the reduced diameter end being substantially equal in dimension to a diameter of said carrying tube, a region between said reduced diameter end and said large diameter end defining said discharge zone; pushing said tubular flexible body over said support tube; connecting said support tube with tubular flexible body to said second end of said transition piece; connecting said first end of said transition piece to said second end of said roller; supplying compressed air through said roller and said transition piece to direct compressed air from said discharge zone outwardly of said transition piece and simultaneously rearwardly in a direction of said roller; and, pushing said flexible body from said support tube to said carrying tube over said transition piece and establishing an air cushion between said tubular flexible body, transition piece and roller.

2. A process according to claim 1, wherein said carrying tube is coated with an adhesive prior to said tubular body being pushed over said carrying tube.

3. A device for manufacturing adhesive rolls for web processing machine rolls for web fed printing presses, comprising:

- a roller formed of a dimensionally stable carrier tube, the carrier tube having a first and second end enclosed with covers to receive bearing journals;
- a support tube having an external diameter;
- a transition piece including a conical surface and a discharge surface, said conical surface having a first conical surface end with a small diameter, said small diameter substantially corresponding to said support tube external diameter and having a second conical surface end with a large diameter, said large diameter being larger than the diameter of said carrier tube, said discharge surface extending between said second conical surface end and a transition piece reduced diameter end, said transition piece reduced diameter end having a diameter substantially equal to the diameter of said carrier tube;
- a foam tubular body having a soft elastic layer, the foam tubular body having an internal diameter which is larger than the support tube external diameter; said transition piece defining a transition piece conduit from a transition piece connection end, connected to an end of said roller, to openings in said discharge surface, said opening being positioned between said second conical surface end and said reduced diameter end of said transition piece; said transition piece including connection means for connecting said transition piece connection end to said roller and for receiving compressed air from said roller for supplying compressed air to said discharge surface; said transition piece including a second connection element for connecting said support tube to said transition piece wherein said support tube having the tubular body thereon, said transition piece and said roller are connected extending essentially axially and the tubular body is passed over said transition piece to said roller on an air cushion which is built up by compressed air issuing at the discharge surface.

4. A device according to claim 3, wherein said transition piece first and second connection elements include threaded pins, said support tube and said carrier tube are each closed at at least one end with a cover, each cover including a threaded hole for receiving said threaded pin, said carrier tube cover including an opening forming a part of said connection means, and one of said threaded pins including a conduit forming a part of a transition piece air supply duct.

5. A device according to claim 4, wherein said transition piece conduit includes an annular canal communicating with said threaded hole and grooved shaped canals extending from said annular canal radially outwardly to said discharge surface.

6. A device according to claim 4 further comprising a compressed air connection pipe including connection means for screwing said compressed-air connection pipe onto an end of said carrier tube for directing compressed air through said carrier tube to a transition piece compressed air duct.

7. A device according to claim 4, wherein said carrier tube is coated with an adhesive before the tubular body is pushed over said carrier tube.

8. A device for manufacturing a web processing machine roll having an adhesive roll with a foam element for web fed printing machines, comprising: a carrier tube forming a roller support surface; a first carrier tube end element including a connection bore, said first carrier tube end element being connected to said carrier tube; a second carrier tube end element connected to said carrier tube, said second end element including a connection bore, said first carrier tube end connection bore and said second carrier tube connection bore being connectable to bearing journals for mounting the carrier tube as a web processing machine roll in a printing press or coating machine; a transition piece including a conical surface with a first end of small diameter and a second end of large diameter, said large diameter being greater than a diameter of said carrier tube, said transition piece including a portion defining a junction site between said second end of said conical surface and a reduced diameter end of said transition piece, said reduced diameter end of said transition piece having a diameter substantially equal to said carrier tube, said transition piece including a first connection pin extending from said transition piece adjacent said conical surface first end and including a second connection pin extending from said transition piece from said reduced diameter end; compressed gas supply means defined by said transition piece including a duct extending through said second connection pin to a discharge zone at said junction site; discharge means defining a compressed air connection for supplying compressed air from said carrier tube first end element to said second end element for delivering gas to said gas supply means after connection of said transition piece second connection pin to said second end of said carrier tube; a support tube having an external diameter and a connection end including a bore for receiving said transition piece first connection pin; and a tubular body of a soft elastic layer, said tubular body having an internal diameter larger than said external diameter of said support tube, said tubular body being pulled from said support tube over said transition piece onto said roller on a cushion of air which is built up by the compressed air issuing at the discharge zone after said carrier tube, transition piece and support tube are connected axially.

9. A device according to claim 8, wherein said discharge means discharges compressed air radially outwardly and in a direction of said carrier tube when said carrier tube and said transmission piece establish said air connection.

* * * * *